March 17, 1970     J. S. ALFORD     3,501,089
JET PUMP EJECTOR
Filed July 17, 1968     2 Sheets-Sheet 2
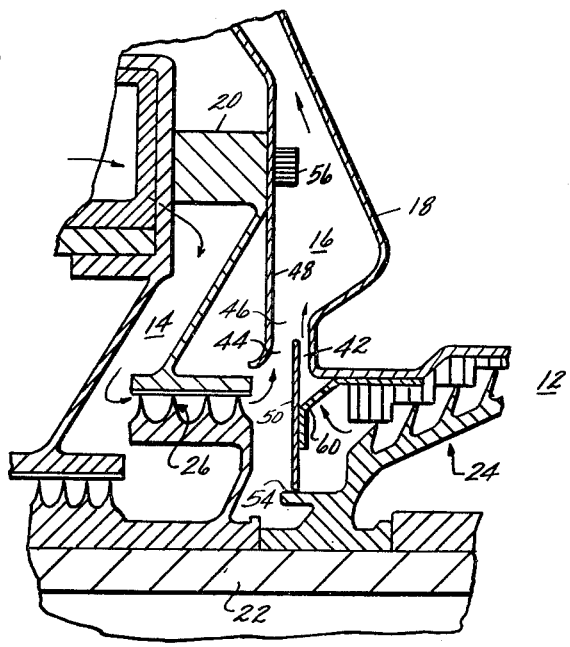
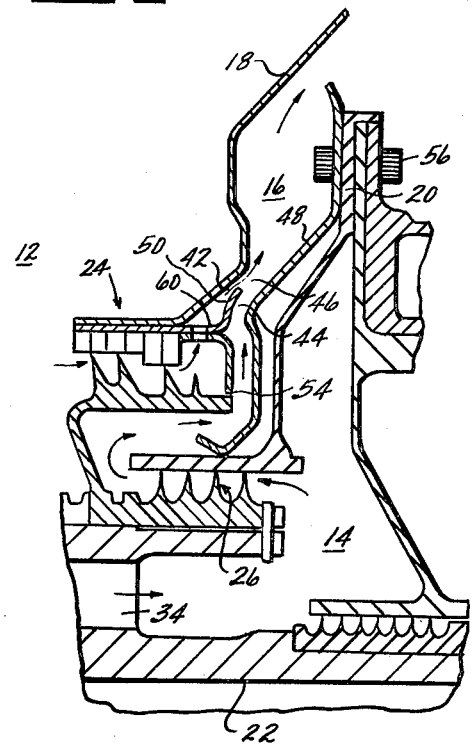
INVENTOR.
JOSEPH S. ALFORD
ATTORNEY United States Patent Office 3,501,089
Patented Mar. 17, 1970

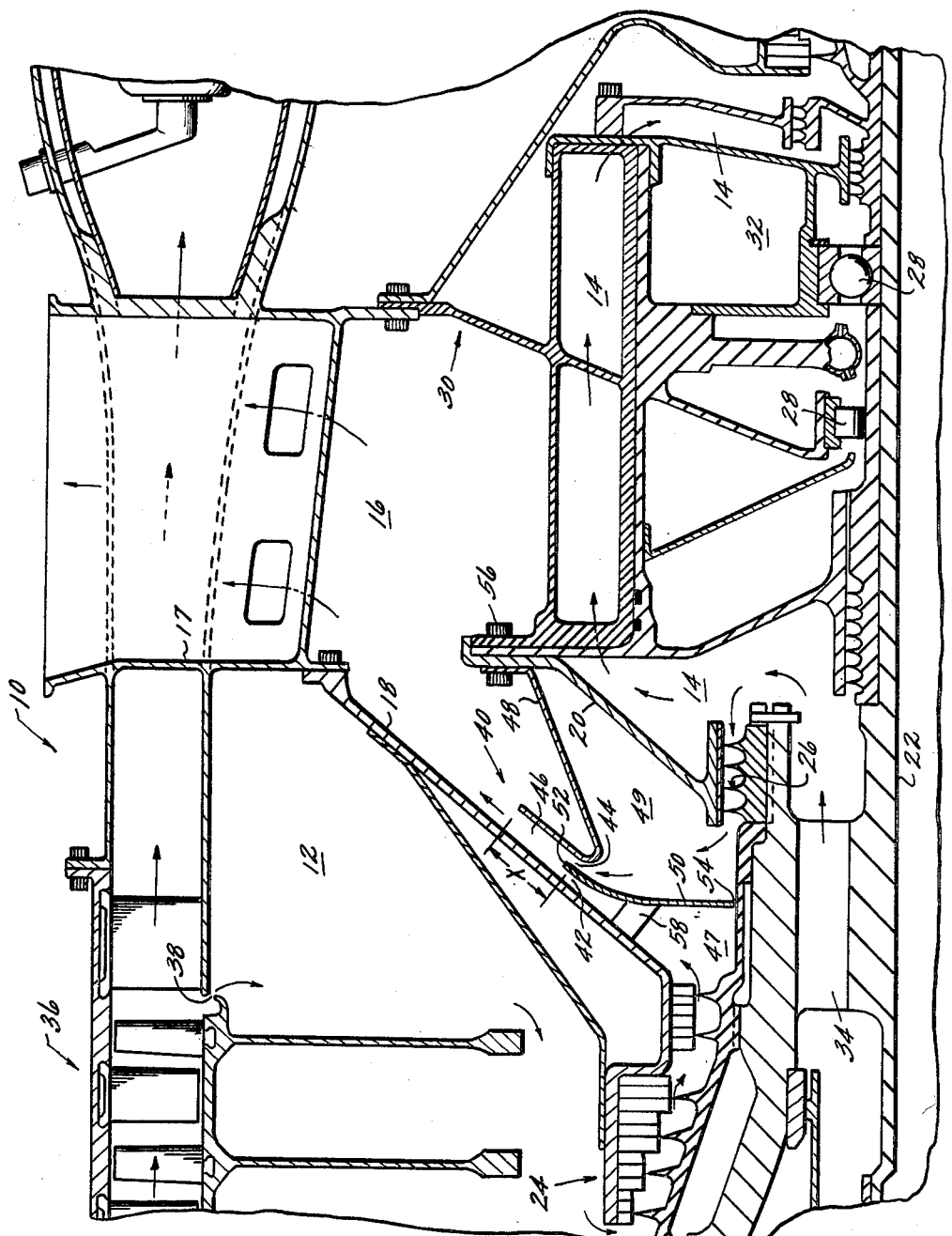

3,501,089
JET PUMP EJECTOR
Joseph S. Alford, Cincinnati, Ohio, assignor to General Electric Company, a corporation of New York
Filed July 17, 1968, Ser. No. 745,446
Int. Cl. F04d 29/58; F01d 25/12; F16f 15/48
U.S. Cl. 230—132
8 Claims

ABSTRACT OF THE DISCLOSURE

Ejector pump means for use between spaced high and low pressure chambers which are formed, in part, by seals having some characteristic leakage and including a mixing throat, a primary nozzle for delivery of fluid into the mixing throat, a secondary nozzle for delivery of fluid into the mixing throat and means for directing fluid leakage from the high pressure seal to the primary nozzle and fluid leakage from the low pressure seal to the secondary nozzle whereby the pressure adjacent the low pressure seal is reduced by ejector pump action.

---

This invention relates to fluid apparatus and more particularly to ejector pump means operative to prevent leakage fluid emanating from a relatively high pressure chamber seal from entering a spaced, low pressure chamber seal.

In fluid apparatus, such as gas or steam turbine engines, it is often necessary or desirable to provide closely spaced chambers which are to be maintained at substantially different pressure and temperature levels. For example, in gas turbine engines, the rotor shaft bearings are usually housed in a chamber or sump in which a lubricant is circulated. In order to protect the lubricant from the surrounding high temperature environment, relatively cool, low pressure fluid is circulated in a chamber which surrounds or encloses the lubricant sump. At the same time, it may bet necessary to provide a further, closely spaced chamber for delivery of relatively high pressure, high temperature compressor discharge fluid to the turbine sector of the engine for cooling purposes.

Where such closely spaced high and low pressure chambers are formed, in part, by seals which are subject to some fluid leakage, the fluid leakage from the high pressure, high temperature chamber seal may pressurize and leak through the low pressure seal. Such carryover leakage is, of course, generally undesirable and is particularly undesirable where, as in the above example, the low pressure chamber is designed to insulate the bearing sump from high temperature since excessive lubricant sump temperatures may result in excessive lubricant consumption, lubricant coking, or even lubricant fires.

The present invention, then, is concerned with preventing or at least substantially reducing such deleterious carryover flow between closely spaced high and low pressure chambers in an extremely efficient and economical manner. In particular, the present invention is concerned with providing ejector pump means which utilize the potentially harmful high pressure seal leakage to prevent such carryover flow.

A primary object of this invention is to provide efficient and economical means for at least substantially reducing the amount of seal leakage fluid emerging from a relatively high pressure, chamber which enters a spaced, low pressure chamber seal.

Another object of this invention is to provide ejector pump means which utilize the high pressure chamber seal leakage to reduce the pressure on the side of the low pressure seal adjacent the high pressure chamber.

Other objects and advantages will become apparent upon reading the following description of the preferred embodiments.

Briefly stated, the present invention provides ejector pump means within a space intermediate a high and low pressure chamber for utilizing the fluid leakage from a high pressure chamber seal to reduce or eliminate carryover leakage of such high pressure leakage fluid into the low pressure chamber. In the preferred form, baffle means are employed to form a mixing throat, a primary nozzle and a secondary nozzle. The primary nozzle is adapted to deliver fluid leakage from the high pressure seal into the mixing throat while the secondary nozzle is adapted to deliver fluid leakage from the low pressure seal into the mixing throat whereby the pressure adjacent the low pressure seal is reduced by ejector pump action. The baffle means may be variously formed depending on the particular configuration of the high and low pressure chamber walls and the spatial relationship of the high and low pressure seals. In one form, the baffle means comprise a first baffle element adapted to form the mixing throat in cooperation with one of the chamber walls and a second baffle element adapted to form the primary and secondary nozzles in cooperation, respectively, with a chamber wall and the first baffle element. Where the chambers are formed, in part, by a central rotating shaft, the second baffle element extends into close spaced relationship therewith so as to compartmentalize the intermediate space into a first portion communicating the high pressure seal leakage with the primary nozzle and a second portion communicating the low pressure seal leakage with the secondary nozzle.

While the specification concludes with claims particularly pointing out and distinctly claiming the subject matter of this invention, it is believed the invention will be better understood from the following description of the preferred embodiments taken in connection with the accompanying drawings wherein:

FIGURE 1 is a cross-sectional view showing a portion of a gas turbine engine employing one embodiment of the ejector pump means of this invention;

FIGURE 2 is a cross-sectional view, like that of FIGURE 1, showing another embodiment of the ejector pump means of this invention; and FIGURE 3 is a cross-sectional view, like that of FIGURE 1, showing yet another embodiment of the ejector pump means of this invention.

Like reference numerals will be used to refer to like parts throughout the following description of the preferred embodiments.

Referring now to the drawings and particularly to FIGURE 1, a portion of a gas turbine engine has been shown generally at 10 formed with a first annular chamber 12 and a second annular chamber 14 spaced therefrom by an intermediate annular chamber 16. The chambers 12, 14 and 16 are formed, in part, by chamber walls 18 and 20, a central rotating shaft 22 and seals 24 and 26 of the type having some characteristic leakage. The shaft 22 is journalled for rotation by bearings, as at 28, carried by suitable supporting structure as at 30.

In the example of FIGURE 1, chamber 14 is generally V-shaped in half cross-section and extends around an inner chamber or sump 32 which houses bearings 28 and is adapted to contain lubricant therefor. The first or high pressure chamber 12 communicates with the discharge end of a compressor 36 through an annular passage 38 and is adapted to deliver compressor discharge fluid to suitable turbomachinery, not shown, for cooling purposes.

To insulate the sump 32 from the surrounding high temperature environment so as to minimize lubricant consumption and prevent lubricant coking, fires and the like, relatively cool, low pressure air is delivered to chamber 14 through shaft passage 34 as indicated by the flow arrows in FIGURE 1.

As will be understood by those skilled in the art, it is virtually impractical, if not impossible, to prohibit fluid leakage through seal 24. Further, since the pressure and temperature of the compressor discharge fluid within chamber 12 may be as high as 300 p.s.i.g. and 1000° F. respectively, such leakage will emerge from seal 24 as a high velocity and high temperature jet. Experience has shown that this high velocity, high temperature leakage jet tends to pressurize the chamber 16 side of seal 26 which results in carryover leakage of relatively high temperature fluid through seal 26 into chamber 14.

Such carryover leakage in turn destroys the insulating effect of chamber 14 and, as pointed out above, may result in excessive lubricant consumption, lubricant coking, fire and the like.

To the end of preventing such carryover leakage and in accordance with the present invention, ejector pump means, shown generally at 40, are provided within the intermediate chamber 16 for utilizing the leakage flow from high pressure seal 24 to reduce the pressure within intermediate chamber 16 adjacent the low pressure seal 26. As will be understood, when the apparent pressure drop across seal 26, directioned from chamber 16 to chamber 14, is reduced, the leakage flow will be reduced and when the pressure at the chamber 16 side of seal 26 is sufficiently reduced to etsablish a positive pressure differential directioned from chamber 14 to chamber 16, all carryover leakage will be eliminated.

As shown in FIGURE 1, the ejector pump means 40 comprise a primary annular nozzle 42, a secondary annular nozzle 44 and an annular mixing throat 46 for receiving the fluid discharged by nozzles 42 and 44.

As shown in FIGURES 1, 2 and 3, the mixing throat 46 is cooperatively formed by a first annular baffle element 48 and chamber wall 18. The primary nozzle 42 and secondary nozzle 44 are formed by a second annular baffle element 50 in cooperation, respectively, with chamber wall 18 and first baffle element 48, with the discharge end of each nozzle being defined by an outer peripheral edge 52 of baffle element 50. The outer peripheral edge 52 may project into the throat 46, as shown in FIGURE 1, or may trminate at a position spaced therefrom.

In order to direct fluid leakage from seal 24 and seal 26, respectively, to nozzle 42 and nozzle 44, baffle element 50 is formed with an inner peripheral edge 54 which is positioned in close spaced relationship with shaft 22. Accordingly, chamber 16 is effectively divided into compartment or portion 47 which directs or communicates fluid leakage from seal 24 to primary nozzle 42 and compartment or portion 49 which directs or communicates fluid leakage from seal 26 to secondary nozzle 44.

The baffle elements 48 and 50 are preferably formed of thin metallic sheet material and may be secured to chamber walls 18 or 20 by any suitable means such as fasteners 56, struts 58, perforated mounting flange 60 or the like.

As shown in FIGURES 1, 2 and 3, the baffle elements 48 and 50 may be variously formed or shaped depending upon the configuration of the chamber walls 18 and 20 and the spatial relationship of seals 24 and 26. It will also be understood by those skilled in the art that the length X and cross-sectional area of the mixing throat 46, the cross-sectional area of the primary nozzle 42, and the cross-sectional area of the secondary nozzle 44 may be varied for a given mass flow rate of high pressure leakage fluid to obtain various degrees of pressure reduction in compartment 49 through the mechanism of aspirator or ejector pump action.

In operation, high pressure fluid leakage from seal 24 flows into portion 47 of chamber 16 and is directed by baffle element 50 to primary nozzle 42 where it is expanded through the primary nozzle 42 and further directed into the mixing throat 46 as a high energy fluid stream. Similarly, leakage flow from seal 26 is directed by baffle element 50 to secondary nozzle 44 and, hence, into the mixing throat as a low energy fluid stream. In the mixing throat 46 an exchange of momentum and energy occurs between the high energy fluid stream and the low energy fluid stream emanating from secondary nozzle 44. A shear plane is set up between the low and high energy streams and through the mechanics of viscous shear and fluid diffusion, the momentum and kinetic energy of the high velocity jet is partially transferred to the low energy stream emenating from secondary nozzle 44. At the conclusion of such mixing, a single stream of fluid with more uniform energy and velocity distribution is formed and a reduced pressure in the portion 49 of chamber 16 is obtained by ejector pump action.

Accordingly, it will be seen that the present invention not only prevents the high pressure leakage fluid from entering the spaced low pressure seal, but utilizes, at no cost in efficiency to the engine, this potentially harmful fluid leakage energy to reduce the pressure in compartment 49 by ejector pump action and thereby provides efficient and economical means for substantially reducing or preventing fluid leakage through seal 26 from chamber 16.

Although the mixing throat 46 has been depicted as a constant area throat, it should be understood that the mixing throat may be of varying cross-sectional area, such as a constant pressure mixing throat, and may have a divergent diffuser portion.

It should also be understood, although the ejector pump means of this invention has been described in connection with a gas turbine engine and is particularly applicable thereto, that this invention may be effectively employed in numerous fluid apparatus applications wherein spaced chambers are to be maintained at substantially different pressure levels. Further, although the ejector pump means of this invention has been depicted and described in connection with labyrinth seals, usage is not limited thereto and the invention may be effectively employed in connection with other dynamic seals as well as static seals of the type having some characteristic leakage.

What is claimed is:

1. In fluid apparatus having a first chamber containing a pressurized first fluid, a second chamber containing a second fluid at a lower pressure than said first fluid, a third chamber intermediate said first and second chambers, a first seal between said first and third chambers and a second seal between said second and third chambers, the improvement comprising:

ejector pump means for utilizing leakage flow through said first seal to reduce the pressure within said third chamber adjacent said second seal to thereby substantially eliminate leakage flow through said second seal directioned from said third chamber to said second chamber.

2. The structure of claim 1 further characterized in that said ejector pump means comprise:

baffle means forming a primary nozzle communicating with the portion of said third chamber adjacent said first seal, a secondary nozzle communicating with the portion of said third chamber adjacent said second seal, and a mixing throat, said primary and said secondary nozzle having adjacent discharge ends disposed to direct fluid flow emerging therefrom into said mixing throat whereby the pressure in the portion of said third chamber adjacent said second seal is reduced by ejector pump action.

3. The structure of claim 2 further characterized in that said chambers are annular and are defined, in part by stationary wall members and a rotatable shaft, with said baffle means including:

a first annular baffle element adapted to form said mixing throat in cooperation with one of said chamber walls, a second annular baffle element adapted to form said primary nozzle and said secondary nozzle in cooperation, respectively, with one of said chamber walls and said first baffle element, said second baffle element having an outer peripheral edge defining the discharge end of said primary and secondary nozzles and an inner peripheral edge disposed in close spaced relationship to said shaft to thereby partition said intermediate chamber into a first portion communicating fluid leakage from said first seal with said mixing throat through said primary nozzle and a second portion communicating fluid leakage from said second seal with said mixing throat through said secondary nozzle.

4. The structure of claim 3 further characterized by and including means for securing said first and second baffle elements to said chamber walls.

5. The structure of claim 3 further characterized in that said first and second baffle elements are formed of metallic sheet material.

6. In fluid apparatus having a first chamber containing a pressurized first fluid, a second chamber containing a second fluid at a lower pressure than said first fluid, a third chamber intermediate said first and second chamber, a first seal between said first and third chamber and a second seal between said second and third chamber, with said seals having some characteristic leakage, the improvement comprising:
   a mixing throat disposed in said third chamber,
   a primary nozzle disposed in said third chamber for delivery of fluid into said mixing throat,
   a secondary nozzle disposed in said third chamber adjacent said primary nozzle for delivery of fluid into said mixing throat, and
   means directing the fluid leakage from said first seal to said primary nozzle and the fluid leakage from said second seal to said secondary nozzle whereby the pressure adjacent the third chamber side of said second seal is reduced by ejector pump action.

7. The structure of claim 6 further characterized in that said chambers are annular and formed, in part, by a central rotatable shaft and including:
   a first annular baffle element disposed in said third chamber and extending into close spaced relationship with a chamber wall to define said mixing throat therebetween, and
   a second annular baffle element having an inner peripheral edge closely spaced to said central rotatable shaft intermediate said first seal and said second seal and terminating in an outer peripheral edge disposed intermediate said one chamber wall and said first baffle element to thereby define, respectively, said primary nozzle in cooperation with said one chamber wall, said secondary nozzle in cooperation with said first baffle element and said fluid leakage directing means.

8. The structure of claim 7 further characterized in that said outer peripheral edge of said second baffle element terminates within said mixing throat.

References Cited

UNITED STATES PATENTS

| | | | |
|---|---|---|---|
| 2,919,891 | 1/1960 | Oliver | 253—39.1 |
| 3,206,166 | 9/1965 | Beldecos et al. | 253—39.15 |
| 3,321,179 | 5/1967 | Johnson et al. | 253—39.1 |
| 3,383,033 | 5/1968 | Moore | 230—132 |
| 2,680,001 | 6/1954 | Batt | 253—39 |

HENRY F. RADUAZO, Primary Examiner

U.S. Cl. X.R.

253—39.1; 277—53